(12) United States Patent
Robertson et al.

(10) Patent No.: US 12,251,783 B2
(45) Date of Patent: Mar. 18, 2025

(54) SYSTEMS AND METHODS FOR CREATING DUPLICATE VEHICLE KEYS

(71) Applicant: iKeyless, LLC, Louisville, KY (US)

(72) Inventors: Douglas Robertson, Crestwood, KY (US); Adam Pizer, Louisville, KY (US); Jon Determann, Louisville, KY (US)

(73) Assignee: IKEYLESS, LLC, Louisville, KY (US)

( * ) Notice: Subject to any disclaimer, the term of this patent is extended or adjusted under 35 U.S.C. 154(b) by 906 days.

(21) Appl. No.: 17/169,287

(22) Filed: Feb. 5, 2021

(65) Prior Publication Data

US 2021/0245319 A1    Aug. 12, 2021

Related U.S. Application Data

(60) Provisional application No. 62/970,419, filed on Feb. 5, 2020.

(51) Int. Cl.
 *B23Q 35/02* (2006.01)
 *G06V 20/64* (2022.01)
 *G07C 9/00* (2020.01)

(52) U.S. Cl.
 CPC ............ *B23Q 35/02* (2013.01); *G06V 20/64* (2022.01); *G07C 9/00309* (2013.01); *G07C 2009/00492* (2013.01)

(58) Field of Classification Search
 None
 See application file for complete search history.

(56) References Cited

U.S. PATENT DOCUMENTS

| | | |
|---|---|---|
| 2,582,012 A | 1/1952 | Currier |
| 3,323,420 A | 6/1967 | Roxburgh |
| 3,413,892 A | 12/1968 | Casey |
| 3,442,174 A | 5/1969 | Weiner et al. |
| 3,796,130 A | 3/1974 | Gartner |
| 4,899,391 A | 2/1990 | Cimino et al. |
| 5,127,532 A | 7/1992 | Cimino et al. |
| 5,807,042 A | 9/1998 | Almblad et al. |
| 6,065,911 A | 5/2000 | Almblad |
| 6,152,662 A | 11/2000 | Titus et al. |
| 6,175,638 B1 | 1/2001 | Yanovsky |
| 6,185,311 B1 | 2/2001 | Yanovsky et al. |
| 6,406,227 B1 | 6/2002 | Titus et al. |
| 6,449,381 B1 | 9/2002 | Yanovsky et al. |

(Continued)

FOREIGN PATENT DOCUMENTS

| | | |
|---|---|---|
| EP | 0 492 372 A2 | 7/1992 |
| EP | 3 412 389 A1 | 12/2018 |

(Continued)

*Primary Examiner* — Leon Viet Q Nguyen
(74) *Attorney, Agent, or Firm* — Gray Ice Higdon

(57) ABSTRACT

The present invention generally relates to the field of replicating or copying keys. More specifically, the present invention relates to creating a copy of a master key based on a captured image of the master key. The present invention identifies a set of target key information based on vehicle and or lock information as well as the image of the master key to provide for the cutting of a duplicate key blade copy to be delivered to a user or to another location. Additional key information may also be captured along with the image of the master key.

21 Claims, 7 Drawing Sheets

(56) References Cited

U.S. PATENT DOCUMENTS

| | | |
|---|---|---|
| 6,543,972 B1 | 4/2003 | Cimino |
| 6,588,995 B2 | 7/2003 | Wills et al. |
| 6,647,308 B1 | 11/2003 | Prejean |
| 6,836,553 B2 | 12/2004 | Campbell et al. |
| 6,839,451 B2 | 1/2005 | Campbell et al. |
| 6,895,100 B1 | 5/2005 | Pacenzia et al. |
| 7,890,878 B2 | 2/2011 | Bass et al. |
| 7,891,919 B2 | 2/2011 | Bass et al. |
| 8,128,322 B2 | 3/2012 | Bass et al. |
| 8,287,215 B2 | 10/2012 | Freeman et al. |
| 8,532,809 B2 | 9/2013 | Freeman |
| 8,626,331 B2 | 1/2014 | Marsh et al. |
| 8,634,655 B2 | 1/2014 | Thompson et al. |
| 8,634,951 B2 | 1/2014 | Freeman |
| 8,644,619 B2 | 2/2014 | Thompson et al. |
| 8,682,468 B2 | 3/2014 | Marsh et al. |
| 8,965,794 B2 | 2/2015 | Bass et al. |
| 8,979,446 B2 | 3/2015 | Freeman |
| 8,985,918 B2 | 3/2015 | Bass et al. |
| 8,992,145 B1 | 3/2015 | Mueller et al. |
| 9,101,990 B2 | 8/2015 | Mutch et al. |
| 9,199,318 B2 | 12/2015 | Freeman et al. |
| 9,269,136 B2 | 2/2016 | Day et al. |
| 9,308,590 B2 | 4/2016 | Bass et al. |
| 9,323,237 B2 | 4/2016 | Freeman |
| 9,323,884 B2 | 4/2016 | Overman et al. |
| 9,468,982 B1 | 10/2016 | Mueller et al. |
| 9,514,385 B2 | 12/2016 | Thompson et al. |
| 9,556,649 B1 | 1/2017 | Mueller et al. |
| 9,558,236 B1 | 1/2017 | Hagen et al. |
| 9,563,885 B2 | 2/2017 | Marsh et al. |
| 9,582,734 B2 | 2/2017 | Thompson et al. |
| 9,656,332 B2 | 5/2017 | Bass et al. |
| 9,682,432 B2 | 6/2017 | Mutch et al. |
| 9,687,920 B2 | 6/2017 | Bass et al. |
| 9,808,900 B2 | 11/2017 | Gardner et al. |
| 9,815,126 B2 | 11/2017 | Bass et al. |
| 9,818,041 B2 | 11/2017 | Mutch et al. |
| 9,914,179 B2 | 3/2018 | Freeman et al. |
| 9,925,601 B2 | 3/2018 | Mutch et al. |
| 9,934,448 B2 | 4/2018 | Thompson et al. |
| 9,950,375 B2 | 4/2018 | Burkett et al. |
| 9,963,908 B2 | 5/2018 | Bass et al. |
| 9,987,715 B2 | 6/2018 | Gardner et al. |
| 10,010,949 B2 | 7/2018 | Hagen et al. |
| 10,013,833 B2 | 7/2018 | Blalock et al. |
| 10,018,982 B2 | 7/2018 | Chambers et al. |
| 10,068,401 B1 | 9/2018 | Blalock et al. |
| 10,252,392 B2 | 4/2019 | Gardner et al. |
| 10,421,133 B2 | 9/2019 | Bass et al. |
| 10,480,214 B2 | 11/2019 | Bass et al. |
| 10,482,439 B2 | 11/2019 | Freeman |
| 10,503,384 B2 * | 12/2019 | Bass .................. G07F 11/70 |
| 2009/0228795 A1 | 9/2009 | Bass |
| 2010/0278438 A1 | 11/2010 | Thompson |
| 2011/0297691 A1 | 12/2011 | Freeman |
| 2011/0301738 A1 | 12/2011 | Freeman |
| 2012/0243957 A1 | 9/2012 | Drake et al. |
| 2013/0138243 A1 | 5/2013 | Freeman |
| 2013/0170693 A1 | 7/2013 | Marsh |
| 2014/0229317 A1 | 8/2014 | Fagan |
| 2014/0314508 A1 | 10/2014 | Seriff |
| 2014/0377027 A1 | 12/2014 | Burkett et al. |
| 2015/0050094 A1 | 2/2015 | Gerlings |
| 2015/0178721 A1 | 6/2015 | Pandiarajan |
| 2015/0199801 A1 | 7/2015 | Day |
| 2016/0114412 A1 | 4/2016 | Bosch |
| 2016/0321632 A1 | 11/2016 | Moore et al. |
| 2016/0375503 A1 | 12/2016 | Bass et al. |
| 2017/0039447 A1 | 2/2017 | Mutch et al. |
| 2017/0193327 A1 | 7/2017 | Thompson et al. |
| 2017/0225242 A1 | 8/2017 | Spangler |
| 2018/0046881 A1 | 2/2018 | Mutch et al. |
| 2018/0065226 A1 | 3/2018 | Gardner et al. |
| 2018/0079014 A1 | 3/2018 | Marsh |
| 2018/0079015 A1 * | 3/2018 | Marsh .................. G06V 10/44 |
| 2018/0154459 A1 | 6/2018 | Freeman |
| 2018/0204089 A1 | 7/2018 | Thompson et al. |
| 2018/0207733 A1 | 7/2018 | Mutch et al. |
| 2018/0232983 A1 | 8/2018 | Blalock et al. |
| 2018/0250785 A1 | 9/2018 | Gardner et al. |
| 2018/0264561 A1 | 9/2018 | Schmidt |
| 2019/0287332 A1 * | 9/2019 | Mutch ............... G07C 9/00857 |
| 2020/0265388 A1 | 8/2020 | Marcelle |
| 2021/0030185 A1 | 2/2021 | Rogers |

FOREIGN PATENT DOCUMENTS

| | | |
|---|---|---|
| EP | 3 412 405 A1 | 12/2018 |
| EP | 3 412 406 A1 | 12/2018 |
| EP | 3 466 577 A1 | 4/2019 |
| GB | 952978 A | 3/1964 |
| GB | 2 293 341 A | 3/1996 |
| GB | 2563224 A | 12/2018 |
| GB | 2564556 A | 1/2019 |
| GB | 2564557 A | 1/2019 |
| GB | 2567194 A | 4/2019 |
| WO | WO 99/55482 A1 | 11/1999 |
| WO | WO 2008/066857 A2 | 6/2008 |
| WO | WO 2011/153473 A2 | 12/2011 |
| WO | WO 2012/170321 A2 | 12/2012 |
| WO | WO 2012/103774 A1 | 7/2013 |

* cited by examiner

SYSTEMS AND METHODS FOR CREATING DUPLICATE VEHICLE KEYS

CROSS-REFERENCE TO RELATED APPLICATION

The present invention claims the benefit of priority to U.S. Prov. Pat. App. No. 62/970,419 filed Feb. 5, 2020, entitled SYSTEMS AND METHODS FOR CREATING REPLACEMENT KEYS (Robertson et al.), which is incorporated by reference herein in its entirety.

FIELD OF INVENTION

The present invention generally relates to the field of replicating or copying keys. More specifically, the present invention relates to creating a copy of a master key based on a captured image of the master key. The present invention identifies a set of target key information based on the image of the master key to provide for the cutting of a duplicate key blade copy to be shipped to a user. Additional key information may also be captured along with the image of the master key.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

Contemporary remote keyless entry systems are designed to be easy to use and secure from attackers. When a user presses a button on his or her keyless remote, an internal microprocessor interprets the request and generates a unique packet of binary data. This packet may contain a unique serial number of the remote, an authentication string, function code, and various checksums. This data packet is then transmitted by the remote via an ultra high frequency radio signal to the vehicle. The user's vehicle can then process the data verifying the remote is authorized and perform the requested action (ex: unlocking a door).

The transmitted radio signal could be monitored by possible attackers so the authentication string is important in maintaining the security of the vehicle. The authentication string often changes with each button press in what is known as a "rolling code". This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Additionally, starting in the early 1990s, car keys began incorporating transponder technology. Transponders are small plastic or glass inserts that are self-contained devices which supplemented the security of the cut key blade. Transponders require no battery and are powered by a low frequency radio signal delivered from a loop of wire around the ignition coil. When a driver starts his or her car, the key blade activates the ignition and the car simultaneously "reads" the transponder via the wire loop to verify the key was authorized to start the car. If the transponder does not "respond" with a valid code (e.g., in the case of hot-wiring a car), the car will shut itself off after a few seconds from starting.

Security transponder evolution has mirrored that of remote keyless entry systems with the first generation being simple, insecure devices that transmitted a fixed value when interrogated by the ignition coil. Much like remote keyless entry, the communication signals can be easily monitored by an attacker with legally available tools. To avoid replay attacks, transponders quickly moved to more complex encryption, such as HITAG and AES, as well as the use of rolling codes. Transponders are now typically highly secure devices capable of bidirectional communication with the vehicle. With the ability for the car to send data to a transponder, some vehicle keys have the ability to store hundreds of bytes of information about the key and vehicle. This information may comprise secret encryption keys and comfort features such as the last radio station used or electronic seat position.

In addition to incorporating transponders with the key blade, remote keyless entry ("RKE") systems and key fobs now incorporate the transponder functionality with remote keyless entry microprocessors on the key blade. The combination of transponder, remote keyless entry microprocessor and system, and key blade forms a combination key where the keyless remote, key blade, and security transponder are packed together into a single device. These devices are both cheaper to produce than keys and remotes and are more secure. The remote keyless entry portion and transponder portion of the key can share information providing for the transponder to receive rolling code and encryption key updates from the vehicle. Using a combination key with the transponder and remote keyless entry system in communication with one another, the rolling code protocols and encryption techniques may become very advanced and unbreakable to all but the most dedicated attacker.

Due to this high margin of security, these devices are not something the lay person could replace or add to their vehicle easily. To pair such a "combo" key to a car requires both a locksmith to cut the blade and specialized programming tools, unavailable to the public, to pair the transponder and remote with the vehicle. Often the vehicle dealer is the only source for keys and pairing tools which leads to high prices for replacement keys/remotes.

Given the complexity of the RKE systems in vehicles, automotive key/remote duplication is a complex and expensive process. Car owners may have a difficult time finding replacement keys and remotes, especially for older vehicles that may no longer be supported by the original manufacturer or automotive dealership.

Once a vehicle owner has located a source for a new RKE device, they must purchase the device and then pay for a locksmith to "pair" the product to the vehicle. This "pairing"

process usually involves the use of an expensive dealer owned programming tool or an aftermarket programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key or remote with the vehicle. Once generated, these authentication codes are static. If the authentication codes were captured during the pairing process, they would remain valid for later usage. Generally, this conversation between the tool and the vehicle includes a security transponder, the vehicle electronic control unit ("ECU") or body control module ("BCM"), and the RKE device. If this process is not executed properly or a programming fault occurs it is possible to leave the car in a "bricked" state where the vehicle will not start or respond properly to the RKE device. It can be a very expensive process to reset the ECU or body control module of a vehicle.

The problem described above can become even more complicated if the vehicle owner loses their RKE device while traveling to locations where they do not have access to a dealership that can support their vehicle. In this instance, the vehicle owner may be faced with significant towing charges and delays while they wait to have their vehicle key replaced by an authorized dealer. These are only the basic challenges associated with replacing keys and remotes. The key generation and replacement problem is even more complex when viewed from a locksmith perspective.

A wide range of tools and software is required to pair an RKE device to a vehicle. A typical suite of tools may include a very expensive programming tool, software modules to cover various vehicle brands and model years, and a separate OBD port module that performs all or part of the pairing process. Tooling and software costs alone can easily exceed $20,000 if the locksmith wants to service a broad range of vehicles.

In addition to the programming tools and software, locksmiths must provide key blades that come in many types and shapes depending on the manufacturer's requirements for the ignition cylinder. Modern blades are typically milled as opposed to traditional grinding wheel approaches. These special cutting tools are also very expensive.

Once the blade issues are addressed, the locksmith may also be required to purchase PIN codes and wait long periods of time to activate the PIN codes during the pairing process. To recover labor and equipment costs locksmiths typically charge their customers significant fees for their services.

From a customer perspective, other issues may occur that may cause the pairing process to become even more complex. In many cases, when performing the pairing process, the customer must have all their keys and remotes available for the locksmith at the time a key is to be paired to the vehicle. The maximum number of keys that can be paired varies between vehicle makes and models but is normally between 4-6 keys. Some vehicles have "master" and "valet" keys. Valet keys cannot normally be used when pairing new keys to the vehicle so, if the master keys have been lost, a new master key must be first be made. Additionally, some customers may need to have their keys or remotes paired to the vehicle again after a vehicle service or repair if the battery was removed from the vehicle for an extended period.

These issues compound to make for a very challenging and negative experience for the customer when replacing or copying an OEM vehicle key. Customers are forced to source replacement keys from dealers or locksmiths.

One possible solution to some of these issues is the use of a "virtual key" hosted entirely on a smartphone. Many virtual key devices bypass traditional immobilizers and security systems. Some even communicate directly with the BCM or ECU. These approaches may be dependent on networks that lack appropriate levels of security thereby putting the vehicle at risk. Additionally, car companies are constantly designing new systems that are unique to their vehicles and do not rely on traditional RKE solutions. In these cases, the customer is forced to purchase expensive replacement keys/remotes directly from the OEM supplier or dealerships. Smart phone related solutions also rely on phone apps and hardware that may have failure modes due to limited network access at critical times. Battery limitations may also be an issue for smart-phone hosted virtual keys. It can be difficult to make the purchasing and pairing of any key, RKE solution, or transponder keyfob, especially a bladed cut key, simple and affordable for a user or consumer.

What is needed is a system and method for a user to remotely order a copy or replacement of a master key. What is needed is a service that enables a user to order a replacement copy of a master key without the burden of locating a replacement product, locating a suitable locksmith, and scheduling a time to have the product paired with the vehicle.

SUMMARY OF THE INVENTION

The present invention provides a system and method for duplicating house and vehicle keys. The system of the present invention comprises a key duplication device which includes a touch screen display that provides a user interface and advertising display. The touch screen display of the key duplication device further provides an interface that accepts as input from a user known vehicle make model and year selections. The key duplication device further comprises an integrated transponder reader that determines transponder type and based at least in part on that determination offers compatible key blanks for user selection. The key duplication device further comprises a camera or imaging device configured to capture an image of the key, the key being positioned in a holder in the key duplication device and illuminated by a set of one or more illumination sources. The key duplication device further comprises a communications interface configured to send the image(s) captured of the key by the camera, key information, vehicle information, of the key and any other information input by the user to a server in a second or remote location for processing.

The server at the remote location comprises a processor or module that, when executing code stored in a memory, determines key bitting (geometry, key code, bitting, etc.). The server may further comprise or may be in communication with a database that is referenced to aid the processor in translating key characteristics into a master key code. The server may further comprise or be in communication with a processor or module that calculates a confidence value that the key was decoded correctly and can flag an operator to review the output manually. The server may further comprise or be in communication with a search tool to assist the algorithm or operator in determining the master key code based at least in part on manually observed characteristics and based at least in part on a database of all possible valid key bitting permutations. The server may further comprise or be in communication with a remote communication device, such as a modem or network card, that receives key code, picture of customer key (not blade), customer vehicle and order information at a hub facility with an operator that may, in some circumstances, validate that the ordered key is compatible with the customer vehicle.

The claimed system and method may further comprise a key creation machine used by the operator to create a key based at least in part on the key code and customer selected blank data. The claimed method may further comprise a delivery service that will bring the cut key to the first location, the first location being the location at which the customer ordered the key, or to another location. The claimed system and method may further comprise a transponder cloning device at the first location or other location that can optionally read the transponder information from the master key and write the information read from the master key into the newly created key which may be the cut key. Alternatively, if cloning is not possible or not desired, the claimed system and method may comprise a programming device configured to provide the delivery driver with the functionality to pair the new key to the vehicle.

The present invention further provides systems and methods for reproducing vehicle OEM keys from stored data relating to an original vehicle OEM key. The present invention provides for key cutting by photo, which enables users to capture images of their keys at a remote location, e.g., a retail location by a compact box or kiosk system, and have keys cut and then shipped to the user. The system and method of the claimed invention eliminates the need of retailers or other businesses to buy unnecessary and expensive key cutting equipment, carry inventory, and provide extensive employee training for key duplication. One such system and method is provided in U.S. patent application Ser. No. 16/898,251, entitled SYSTEMS AND METHODS FOR CREATING REPLACEMENT VEHICLE KEYS, Determann et al., filed Jun. 10, 2020, which is incorporated by reference herein in its entirety.

The system of the present invention may be one element or component of an affordable system for the ordering and pairing of replacement keys by a user. The claimed invention provides for the ordering of replacement keys by a user from an application, website, webstore, kiosk, or physical store. The present invention also provides an inexpensive and simplified method for pairing a replacement key with a vehicle, such as by a pairing dongle. The present invention also provides for the cutting of a keyblade on a replacement key without requiring a locksmith to perform an expensive and complicated replacement cutting at the consumer's location. The cutting of a replacement keyblade from a set of stored information reduces the risk of a miscut or incompatible key and reduces the inconvenience for the user in ordering a replacement key.

In one embodiment, a user inputs vehicle make-model-year ("MMY") information on a touchscreen device and inserts a master key of which a copy is to be made into a holder which positions the key into a photo chamber. The system aligns the key relative to the camera and then captures one or more images in order for an image processing algorithm to identify and store all of the key bitting information that is required to make a copy of the key. Alternatively, the user may use a handheld image capture device and capture one or more photos of the master key which are then processed by an image processing algorithm to identify and store the key bitting information. This may be the preferred method of capturing and processing an image of the key to determine and store bitting information. The system may also prompt the user to adjust the position of the key, adjust the position of the camera, modify the captured image, or make other changes required to obtain an image of the master key that is suitable for further processing. The determination of the bitting information may be done on the device at a retail location, on the handheld device, or it may be done after the images have been uploaded to a server.

After a set of images of the master key to be copied have been captured by the system using either of the embodiments described above, the captured images are sent electronically over a computer network to a central processing server where the images are validated and processed, which can include determination of key bitting information. A new key will be cut and shipped out to the user's location or dispatched to a retail location for pickup upon request by the user or after the image of the master key has been received and processed depending on the order or request type.

For some vehicle master keys, additional information may be captured at the same time the images of the master key are captured. For example, for some keys transponder and rolling code information may be captured by the system such that a copy or clone of the original master key may be produced along with the cut key blade. When that information is not captured with the images of the master key, the user will be sent a programming device with instructions on pairing the newly cut key copy to the user's vehicle.

The system and method of the claimed invention is able to cut a copy of a master key based on a set of images of the master key with a high degree of success. The system and method of the claimed invention is also able to accurately read, transfer, and remotely program key transponder information and other information such as rolling code information for a newly cut key copy. By capturing images of a master key using a handheld image capture device or by using a kiosk at a remote location, the system and method of the claimed invention is able to deliver by mail a replacement cut key copy to a user within 48 hours of a request being received. An order for the cut key copy may be processed and fulfilled within 2 business hours using the system and method of the claimed invention. If dispatched to a retail location for pickup, a replacement cut key copy may be delivered to a user within 2 business hours.

The claimed invention is able to create copies from images of master keys for both edge cut and high security key types. The process of actually cutting the key blade copy based on the images of the master key may either be a manual or automatic process, such as by a completely automatic key cutting machine.

Images of the master key may either be a single image, a best image selected from a set of images, or a composite image stitched together and comprised of a set of images forming an ideal target image. A video may also be used to form a complete composite image of a master key. Additionally, other information such as vehicle MMY, vehicle body type, and vehicle identification number ("VIN") information may be captured along with the image or images of the master key to be used to cut a key blade copy.

Processing of the image or images of the master key to be copied comprises the first step of detecting the outline of the key in a 2-D space, broken up into best-fit line segments, then evaluating those segments according to a set of known key blank physical properties and applicable tolerances in order to auto-correct (deskew, stretch/compress), auto-rotate, auto-align, and auto-scale the key image to either the tip or shoulder. The properties considered in this evaluation may include security type (edge-cut or high security), double or single sided, parallel and orthogonal surface locations, blade width, blade tip to shoulder distance, blade tip to first bit distance, blade shoulder to first bit distance, flat widths, cut angles, alignment surfaces (i.e., tip or shoulder), keyway profile, and MMY (in consideration of key wear likelihood and tendency). The second step of determining the grid extents is performed: Parallel lines, one for the top and one for the bottom, are assigned; next, at a right angle to the top and bottom lines, the tip and shoulder (if applicable to the key blank) lines are assigned. The third step consists of overlaying a "grid" of the key blank's known depth and spacing data (DSD) onto the key image, where one or more image processing algorithms (e.g., edge detection, shape correlation) is then used to assign a bit position and bit number, along with a confidence value. The confidence value may be a function of one or more of the following: known tolerances; thicknesses of detected shadows at each suspected bit position location; degree of agreement between opposite sides (in the case of a 2-sided symmetrical keyway); blade profile differences that can contribute to predictable differences in light and shadow thicknesses; bit error at each bit position using the absolute value of the error between the measured cut depth and the depth assigned to the detected bit value; and the sum of this same error across all bits. Next, at each bit position, the bit number with the highest confidence value is output. This is the First Pass Bitting Output. The fourth step enables a pseudo closed-loop bitting determination/validation algorithm, which is iterative in nature and is critical in the evaluation and adjustment of the bitting output of each "pass" to ultimately arrive at the final bitting output with the highest confidence value. This algorithm consists of referencing known validation data against each "pass" of the algorithm and updating the confidence value at each bit position. For greater quality control, when the final bitting output is determined, to help minimize incorrect key bitting determination and unhappy customers, if the confidence value is below a predetermined threshold, an expert operator at iKeyless is flagged to manually check and/or adjust the deciphered key characteristics.

The primary validation data used is simply the lookup table of all valid bitting permutations, or "key codes" for the known key series. After each pass of the algorithm, a confidence value is calculated based on the bit error at each bit position between the absolute value of the difference between the measured cut depth at that bit position and the cut depth associated to the bit value at that same position of the potential matching key code. It should be noted that for any pass of the algorithm, a falsely deciphered key code match is inherently unlikely as the number of key codes in any particular key series is a small subset of all possible permutations that can be generated from the full space of bitting. For example, key series "40000-49999" used on Toyota 5-cut high security keys has 10,000 key codes, out of 59,049 (10 bit positions, 3 depths) possible permutations. So, in this example, the probability of wrongly deciphering a series of key cuts as any key code is about 17%. The probability of a false match is further decreased by applying the previously described predetermined confidence value limit to every potential match and selecting the potential match with the highest confidence value.

To aid the automatic algorithm and/or operator in reducing the number of passes of the algorithm (i.e., reducing the number of possible matching key codes), a key code/bitting search algorithm has been developed that allows the search criteria to be one or more of the following: The maximum bit value allowed at the first bit position, the minimum and maximum bits values, the number of bits, the maximum adjacent bit variation (MACS), the minimum number of different bit values, the minimum difference between the highest bit value and lowest bit value, the maximum number of repeated adjacent bit values, the maximum number of times any bit value may appear, the likelihood that any two or more bit positions are the same bit values, and the possible range of values at any particular bit position. Again given the low probability of a false match to a valid key code within a known key series and again using the key series "40000-49999" as an example, the key code/bitting search algorithm can reduce the list of potential matches from 10,000 to 3 with only a few of the search criteria being applied. At that point, the match with the highest calculated confidence value is selected.

When manual checking and adjustment occurs, over time, the algorithm may log its iterative failures and final successes to allow for experts to adjust the automatic algorithms, helping to increase the final pass bitting output accuracy.

Alternatively, or in addition, processing of the image or images of the master key to be copied comprises evaluating the image according to key bitting rules and determining if the key bittings determined from the image or images is within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A set of target key features are determined from this best possible outline to be used to create the key blade copy. The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a key blade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

When an order for a new key blade copy is placed, a shipping order is created based on stored or entered user information and then a set of shipping labels are generated to be used for shipping the key blade copy to the user. The user's address and vehicle ownership may be validated by the system prior to generating the shipping order information and the shipping labels.

In one exemplary process a user may have a handheld computing device, such as a laptop, tablet, cell phone, or smartphone with image capture capability, with an application installed thereon. When launched, the application provides for a process to begin for the user to capture images of a master key to be used for a key blade copy order. The user may be shown a video or a series of images as instructions for the image capture and order processes.

The user selects or inputs vehicle MMY and the system and application continually updates subsequent selections and options based on the previous selections. The user also inputs name, email address, VIN, shipping address and confirms this information. The email address and shipping address may also be validated. The application then launches an image capture mode and will auto-focus to get the master key in focus, then the user presses a button or interacts with a user interface element in the application to capture an image of the master key with the handheld computing device. The captured image is analyzed in real-time to ensure the image is of the quality needed for further processing and provides input back to the user. The application may notify the user that the picture of sufficient quality or may inform the user that they need to recapture the image.

Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

Once a validated image is complete, the user is notified that they will receive a key programming dongle programmer that will allow them to pair the newly cut key blade copy, which may comprise other components such as a programmable key fob or transponder, to their car themselves. This saves the time and money, and the total price of the key copy includes the price of the programmer included. The programmer includes instructions for pairing the new key copy to the user's vehicle when it is shipped.

The user may be prompted for additional information, such as payment information, to complete an order. This process may be completed entirely on a handheld computing device or may be performed by a stand-alone kiosk, by a combination of a handheld computing device and a stand-alone kiosk, or by a retailer's point-of-sale ("POS") system. After an order has been confirmed the user may be provided with confirmation such as by receiving an email with the order information therein. The email or order confirmation may also comprise a receipt, an estimated shipping date, and contact and support information-such as a sales and support website where a user may view their order and purchase information. After an order has been completed the application resets to an initial state to allow the user to order another key or to allow a different user to order a key.

The replacement key of the present invention works without requiring a "pairing" process. A pairing process for a vehicle key is a multi-step process that typically involves the user performing multiple operations with either the key or vehicle or both that may include opening/closing doors, opening/closing windows, pressing buttons on the vehicle key, operating controls in the vehicle, starting and turning off the vehicle, and also includes authenticating the vehicle key with the vehicle by synchronizing encryption information which may include the entry of a unique PIN. Additionally, pairing requires the use of specialized tools that must be connected to either the key, the vehicle, or both and that may only be used by authorized vehicle dealers or locksmiths.

Replacement or duplicate keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in U.S. patent application Ser. No. 14/165,922, filed Jan. 28, 2014 (patented as U.S. Pat. No. 10,115,255) entitled METHOD AND APPARATUS FOR IMPLEMENTING MULTI-VENDOR ROLLING CODE KEYLESS ENTRY SYSTEMS (Johnson et al.), which is incorporated by reference herein in its entirety. Methods and systems for dongle-based key pairing and programming are described in U.S. patent application Ser. No. 16/947,892 filed Aug. 23, 2020, entitled SYSTEM AND METHOD FOR PAIRING A KEY WITH A VEHICLE VIA A VEHICLE COMMUNICATIONS PORT BY A DONGLE (Johnson et al.), which is incorporated herein by reference in its entirety. Replacement or duplicate keys and related information may be stored in a "key bank" such as described in U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which is incorporated herein by reference in its entirety. Another system for processing information related to master keys for duplicating is described in U.S. patent application Ser. No. 16/898,251 filed Jun. 10, 2020, entitled SYSTEMS AND METHODS FOR CREATING REPLACEMENT VEHICLE KEYS (Determan et al.), which is incorporated by reference herein in its entirety. An additional system for providing key duplication processing information related to master keys for duplicating is described in U.S. Provisional Patent App. 62/970,661 filed Feb. 5, 2020, entitled SYSTEMS AND METHODS FOR CREATING DUPLICATE VEHICLE KEYS (Robertson et al.), which is incorporated by reference herein in its entirety.

The system and method of the present invention provide for a significant reduction in capital expenditures compared with prior art systems that require cutting machines at every spoke or end location. The present invention replaces expensive, bespoke key replacement kiosks and systems with low a cost tablet-based key data reading system. The centralized key blank inventory and management and centralized center of competencies for the key decoding, cutting, and delivery of the present invention further reduces logistical and supply chain complexities and costs. This centralization helps to reduce the impact of rapid turnover in retail environments, reduces or eliminates investment needed by spokes or end locations (e.g., businesses) for key cutting training, concentrates knowledge and training into a very small number of people at a hub location, and eliminates or significantly reduces the historical need for consumers to use specialized locksmiths or dealerships to get a key made.

In addition, a key code is identified, resulting in a quality, cut to spec key, rather than a key simply copied to its outline, or trace, with defects from wear and abuse and the so-called copy-of-a-copy effect. In one embodiment of the present invention integration of cloning of master key transponder and other information saves on the cost of a "token" and time needed to pair the key using a key programming tool. Furthermore, having the cloning of the transponder occurring locally in proximity to the customer's vehicle provides for cloning of keys that require "sniffing" of the key-vehicle conversation during the cloning process.

In a first embodiment the present invention provides a method for creating a duplicate of a master key based on an image of the master key key blade captured at a remote access device, the image communicated to a hub facility via a communications network, the method comprising: presenting, at a remote access device, a user interface having a set of user selectable elements for inputting prompted information; receiving via the user interface a user input identifying a master key based on a vehicle make, model and year associated with a target vehicle operated by the master key; based on the user input, determining a set of potential key blank matches from a database of stored OEM key types, presenting the set of potential key blank matches via the user interface, and receiving a key blank selection of a selected one from the set of potential key blank matches; storing the user input data and the key blank selection in a memory of the remote access device; positioning the master key for image capture by an imaging device associated with the remote access device; capturing master key image data by the imaging device and storing the master key image data and user input data in a memory of the remote access device and generating a key order record comprising the image data, the key blank selection, the user input data and transaction identifying data; communicating the key order record to one or both of a central key service and/or a hub key cutting facility; determining, by the central key service, a set of master key code data based on the received user input data and the set of master key image data, comparing the determined set of master key code data with a database of valid OEM key code data, and determining a set of key cutting data and providing the set of key cutting data to the key cutting hub; and cutting, by the key cutting hub, a duplicate key based on the set of key cutting data.

The first embodiment may be further characterized in one or more of the following manners: wherein determining, by the central key service, a set of master key code data based on the received user input data and the set of master key image data further comprises: designating an image from the master key image data as a target image; retrieving a set of key rules from a database; determining a geometric outline of the master key from the target image; determining a set of key features from the geometric outline; determining a set of key bitting information from the set of key features; storing the set of key bitting information and the set of key features in the database; and generating the set of key cutting data based on the set of stored key bitting information and the set of key features; or identifying a first set of faults in the set of key features by comparing the set of key features to the set of key rules; identifying a second set of faults in the set of key bitting information by comparing the set of key bitting information to the set of key rules; and marking the first set of faults and the second set of faults in the target image of the master key; or correcting the first set of faults and the second set of faults to generate a best possible geometric outline and updating the set of key features and the set of key bitting information based on the best possible geometric outline; wherein correcting the first set of faults and the second set of faults comprises adjusting cut height and bitting to compensate for worn contours on the master key; or further comprising capturing, by the remote access device, a set of transponder information related to the master key; or wherein capturing, by the remote access device, a set of transponder information includes at least one of the following steps: prompting a user to press a button on the master key and determining a fundamental frequency; reading transponder and determining type and reading transponder data; prompting user for FCCID data and receive user input of FCCID data; and prompting user to take image of FCCID information on master key, applying OCR to image of FCCID data and determining if valid FCCID data is captured (can also use OCR to detect a stamp or other indicia on the key blade or an OEM emblem or other marking); or further comprising applying an image processing technique to the master key image data, the image processing technique selected from the group consisting of: compensating for image parallax, applying digital filters to the captured image, applying color or greyscale modes for higher quality images, applying edge detection and contrast enhancement filters or algorithms, and applying sequential imaging and filtering algorithms; or wherein capturing master key image data by the imaging device comprises rejecting a captured image and prompting a user to capture an additional image of the master key; or wherein capturing master key image data by the imaging device comprises collecting a series of images of the master key key blade at different positions; and wherein determining a set of potential key blank matches from a database of stored OEM key types, may include presenting via a display a series of prompts, and wherein the series of prompts may include one or more of: iteratively determining through database means a prompt (e.g., "To start the car, do you press a start button?", "Which stamp do you have on the blade", "Which key head shape looks like yours?", "Which blade looks like yours?", "What's your FCCID?", "What's your OEM P/N", "What color is the key head?", "Look at the rear of the key. Which looks like yours?") or series of prompts, the answers to which will result in the fewest remaining potential key blank matches.

In a second embodiment the present invention provides a system comprising a plurality of remote access devices for receiving user input and master key data, a central key service for processing master key data to determine duplicate key cutting data, and a key cutting hub for cutting duplicate keys based on the key cutting data, the system comprising: a remote access devices having a processor, a memory having stored therein instructions executable by the processor, an imaging device, a user interface for receiving user inputs, and a set of non-transitory instructions stored in the memory and configured, when executed by the processor, to cause the remote access device to: present a user interface having a set of user selectable elements for inputting prompted information; receive via the user interface a user input identifying a master key based on a vehicle make, model and year associated with a target vehicle operated by the master key; based on the user input, determine a set of potential key blank matches from a database of stored OEM key types, present the set of potential key blank matches via the user interface, and receive a key blank selection; store the user input data and the key blank selection in the memory of the remote access device; capture master key image data by the imaging device and store the master key image data and user input data in the memory; generate a key order record comprising the image data, the key blank selection, the user input data and transaction identifying data; communicate the key order record to one or both of a central key service and/or a key cutting hub; a server associated with a central key service and configured to determine a set of master key code data based on the received user input data and the set of master key image data, compare the determined set of master key code data with a database of valid OEM key code data, and determine a set of key cutting data and provide the set of key cutting data to the key cutting machine; and a key cutting machine configured to receive the set of key cutting data from the server and cut a duplicate key based on the set of key cutting data.

The second embodiment may be further characterized in one or more of the following manners wherein the server is further configured to: designate an image form the master key image data as a target image; retrieve a set of key rules from a database; determine a geometric outline of the master key from the target image; determine a set of key features from the geometric outline; determine a set of key bitting information from the set of key features; store the set of key bitting information and the set of key features in the database; and generate the set of key cutting data based on the set of stored key bitting information and the set of key features; or wherein the server is further configured to: identify a first set of faults in the set of key features by comparing the set of key features to the set of key rules; identify a second set of faults in the set of key bitting information by comparing the set of key bitting information to the set of key rules; and mark the first set of faults and the second set of faults in the target image of the master key; or wherein the server is further configured to correct the first set of faults and the second set of faults to generate a best possible geometric outline, update the set of key features and the set of key bitting information based on the best possible geometric outline, and adjust cut height and bitting to compensate for worn contours on the master key; or wherein the set of non-transitory instructions are further adapted to cause the remote access device to capture a set of transponder information related to the master key; or wherein the set of non-transitory instructions are further adapted to cause the remote access device to: prompt a user to press a button on the master key and determine a fundamental frequency; read transponder and determine type and read transponder data; prompt user for FCCID data and receive user input of FCCID data; and prompt user to take image of FCCID information on master key, apply OCR to image of FCCID data and determine if valid FCCID data is captured; or wherein the server is further configured to apply an image processing technique to the master key image data, the image processing technique selected from the group consisting of: compensating for image parallax, applying digital filters to the captured image, applying color or greyscale modes for higher quality images, applying edge detection and contrast enhancement filters or algorithms, and applying sequential imaging and filtering algorithms; or wherein the set of non-transitory instructions are further adapted to cause the remote access device to apply a set of criteria to the master key image data, reject a captured image based on the set of criteria, and prompt a user to capture an additional image of the master key; or wherein capturing master key image data by the imaging device comprises collecting a series of images of the master key key blade at different positions.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides a low-cost, counter-mounted box replacement key ordering device, that uses a smart device, such as a smartphone, all-in-one computer, or tablet (e.g., a device that comprises a touchscreen interface and camera), a minimal clamp to hold a key blade from a master key in the box in front of the smart device's camera, and a low cost light source to capture an image of the master key to be used for providing a replacement key, which may be referred to as a key copy or cut key, to a customer or user operating the replacement key ordering device. In some embodiments, the light source may not be used and a printed grid positioned adjacent to the key may be used to provide scale and/or perspective for a captured image.

Figure 1:
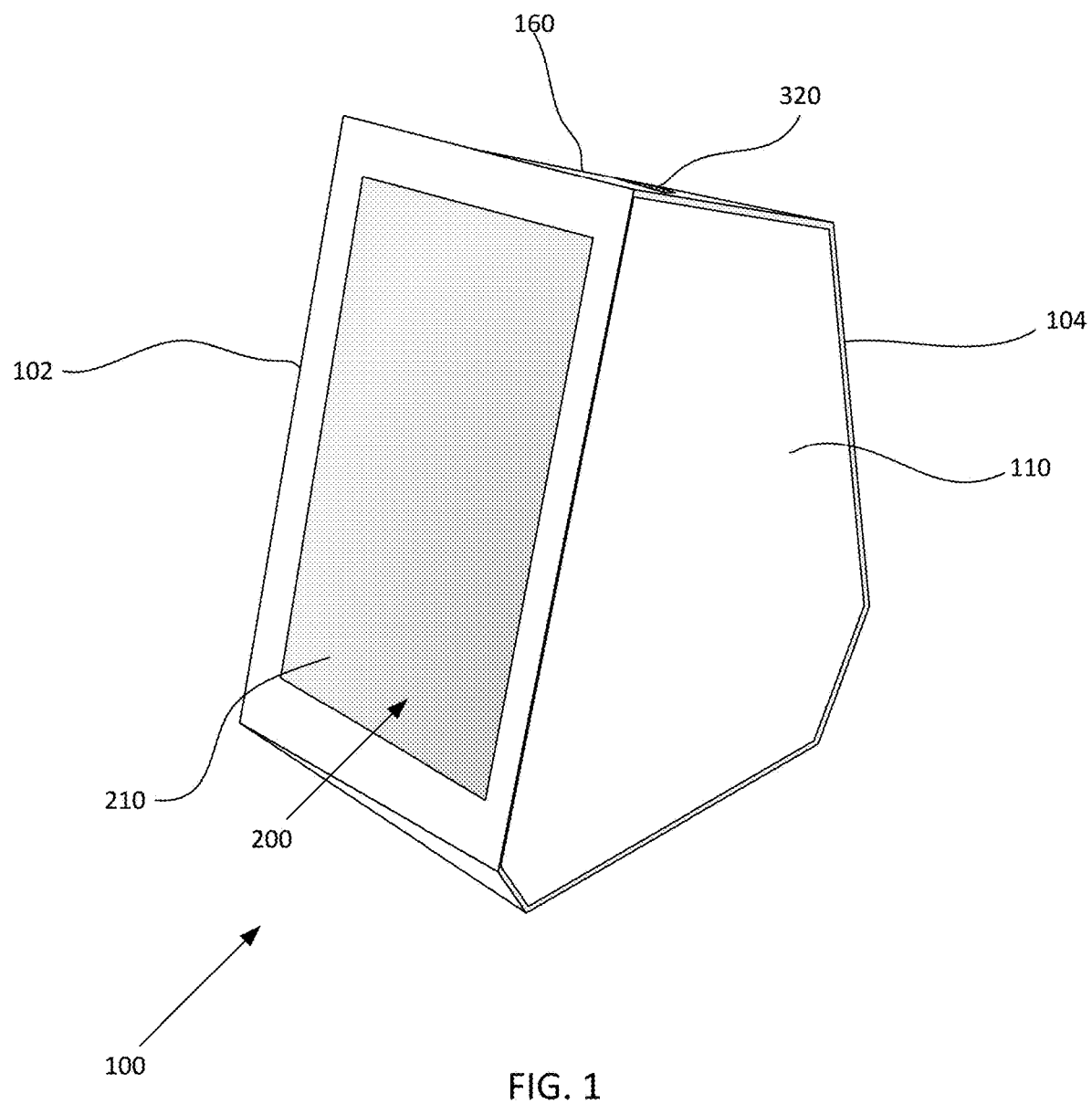
FIGS. 1 and 2 provide perspective views of an apparatus for obtaining a captured image of a master key according to the system and application of the present invention.
Figure 2:
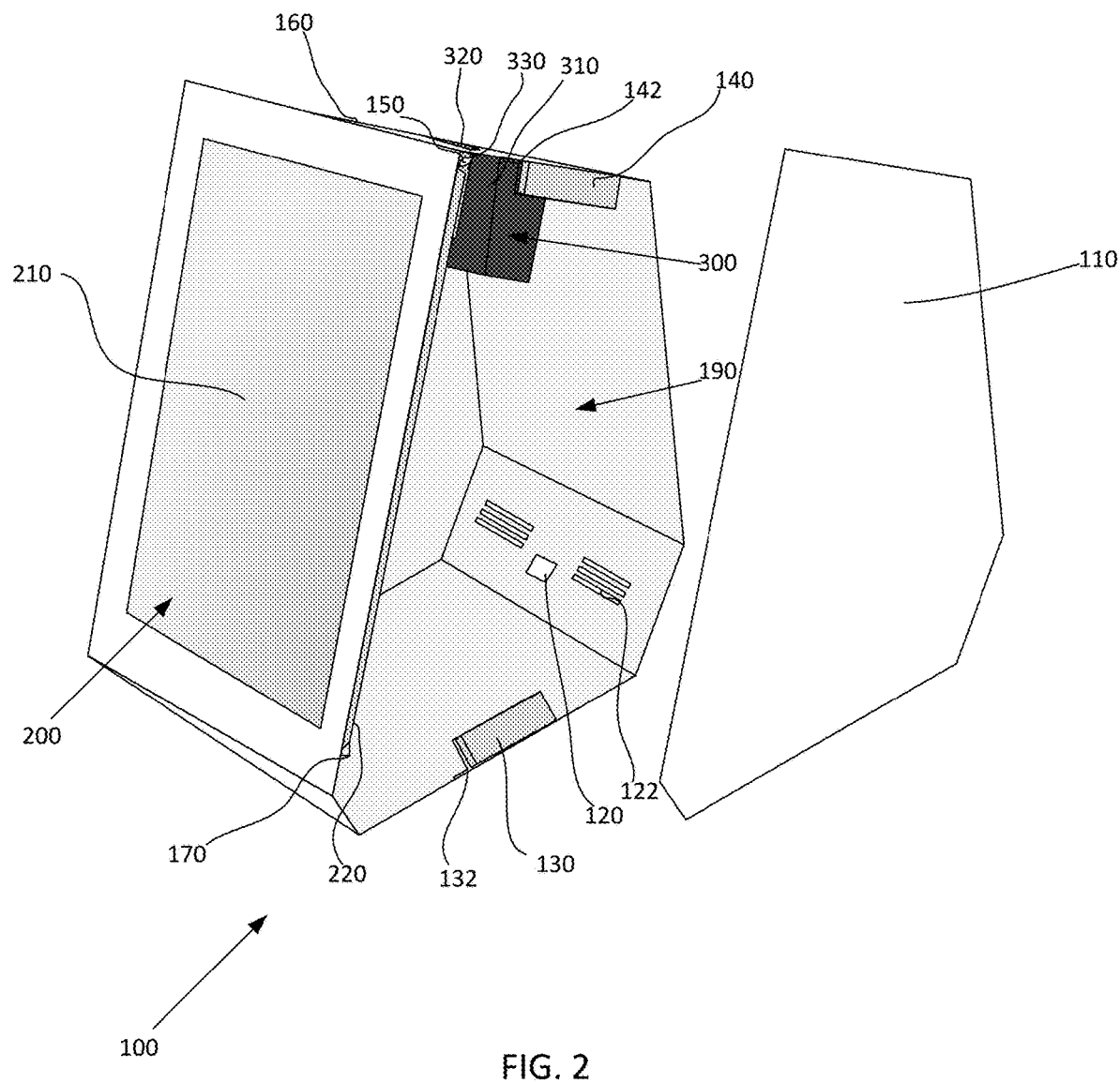
Figure 3:
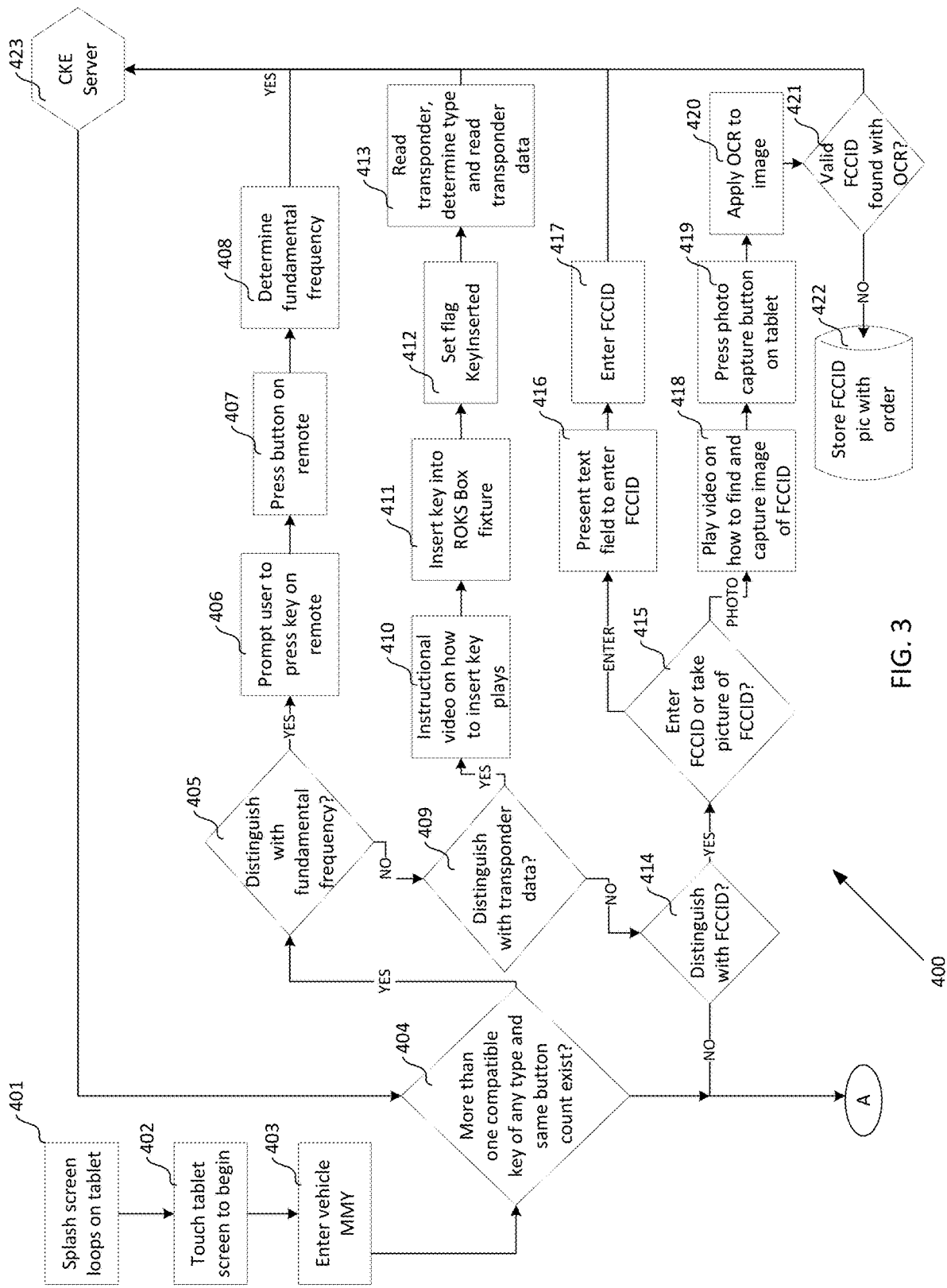
FIGS. 3-6 provide a series of flowcharts illustrating an exemplary process for a user ordering a duplicate or replacement master key according to the present invention.

With reference to FIGS. 1 and 2, perspective views of an apparatus for obtaining a captured image of a master key according to the system and application of the present invention are provided. The apparatus, replacement key ordering device 100, which may be referred to herein and in the figures as a remote order key system, retail order kiosk system, or Retail Optical Key Scanning ("ROKS") box 100 or as the ROKS device 100, comprises a housing 102 in which a smart device 200 is disposed at the front. The touch-screen or display 210 of the smart device 200, which is a tablet, smart phone, or other device capable of displaying information, receiving user inputs, communicating over a network, and capturing images, is accessible at the front of the housing 102. A key port or slot 320 is at the top 160 of the housing and provides for a key to be inserted into the clamp assembly 300 for holding the key blade of a master key to be imaged for copying. A removable side panel 110 is removably secured, such as by magnets, clips, or other suitable fasteners, in an opening 104 in one side of the housing 102.

The clamp assembly 300 is disposed at the top 160 of the housing 102 and in the interior space 190 of the housing 102, wherein the key channel 330 is correspondingly positioned with the key port or slot 320 such that the key blade of a master key to be imaged for copying may be inserted through the key port or slot 320 into the key channel 330 of the clamp assembly 300. The key channel 330 of the clamp assembly 300 aligns and positions the key blade of the master key such that an imaging device, such as a camera, of the smart device 200 may capture an image of the key blade. The imaging device may be an integral feature of the smart device 200 or may be a separate device operatively connected to communicate an image to the smart device 200. The key channel 330 may comprise a retaining mechanism such as a set of tabs, spring retention posts, springs, or elastic positioning members such as silicone protrusions to position and align a key blade within the key channel 330.

The body 220 of the smart device 200 is retained in the interior space 190 of the housing 102 by a set of retaining members 170 such that the display 210 of the smart device 200 is viewable and accessible via an opening at the front of the housing 102. A set of magnetic retainers 130 and 140, disposed on and secured to respective brackets 132 and 142, are used to releasably and magnetically secure the side panel 110 in place. A set of vents 122 and an access port 120 may be positioned at the back of the housing 102 to provide for a charging, power, and/or data cable to reach the smart device 200 and to provide for the exhaust of heat generated by the smart device 200 from the interior 190 of the housing 102. A set of one or more illumination devices 150 may be used to illuminate the key blade in the key channel 330 of the clamping assembly 300 for image capture by the smart device 200. Alternatively, a light source on the smart device 200, such as a flash, flashlight, or other rear light source, may be used. Additionally, alternatively or in addition to the illumination devices 150 a keyed scale or other indicators or markings 310 may be placed on the clamping assembly 300 adjacent to the key channel 330 to provide for determining the positioning, scale, angle, size, and other attributes of the key blade of the master key and may be included in an image presented via display 210 to the user to assist in proper alignment and position of the key blade for imaging.

The remote access device 100 serves as a key ordering portal or device and provides for a sales model that may be referred to as "hub and spoke". The "spoke" is, for example, an auto parts store, auto repair shop, or tire shop that is frequented by car owner customers, e.g., in connection with repair services for the customer's car. The "hub" is, for example, a large retail parts store or distribution center with a more extensive inventory for serving a plurality of "spoke" stores located within a few miles of it. This model typically involves the hub or spoke having drivers regularly receiving or delivering parts from the hub to the spoke.

With reference now to FIGS. 3-6, provide a series of flowcharts illustrating an exemplary process 400 for a user presenting a master key for imaging and duplicating and for ordering a duplicate or replacement of a master key according to the present invention are provided.

At step 401 the customer using the device 100 at the spoke location encounters the device 100 displaying a looping splash screen on the display 210 of the smart device 200, shown in FIGS. 1-2. At step 402 the user interacts with the display 210 to begin entering information, and then in step 403 the user enters their vehicle data, such as vehicle make, model, and year ("MMY"). At decision 404 it is determined if more than one compatible key of any type and same key fob button count/configuration exist for the entered vehicle make and model. In the event multiple key blank types are associated with the MMY and other data entered by the user the system may prompt the user with a series of questions to further limit the set of potential key blank matches from the database of stored OEM key types. This process may include presenting via a display a series of prompts, and wherein the series of prompts may include one or more of: iteratively determining through database means a prompt (e.g., "To start the car, do you press a start button?", "Which stamp do you have on the blade", "Which key head shape looks like yours?", "Which blade looks like yours?", "What's your FCCID?", "What's your OEM P/N", "What color is the key head?", "Look at the rear of the key. Which looks like yours?") or series of prompts, the answers to which will result in the fewest remaining potential key blank matches.

If there are, at decision 405 it is determined if the key can be distinguished using a fundamental frequency for the key. If yes, at step 406 the user is prompted to press a button or key on the remote of the key fob for step 407. At step 408, the fundamental frequency is determined and sent to the car keys express ("CKE") server 423, which then returns data (e.g., a determined key type based on the fundamental frequency) back to the device 100.

If the key cannot be distinguished by fundamental frequency, at decision 409 it is determined if the key can be distinguished by transponder data. To reduce the possibility of the customer selecting an incompatible key after the customer enters their vehicle data, it is determined by accessing information in a database if multiple keys, key fobs, or remotes with an integrated transponder could be compatible. This is done using an integrated transponder reader. A transponder type (e.g., "Megamos", "Philips 46", "HITAG2", "HITAG-AES", "DST-80", etc) is determined and additional transponder data (e.g., the value at page 0x10) are read and uploaded to the server to further filter the results of truly compatible keys/remotes. If this can be determined, in step 410 an instructional video on how to insert the key plays and in step 411 the user inserts the key blade into the ROKS device 100. In step 412 a flag is set that the key is inserted and in step 413 the transponder on the key is read, the transponder type is determined, the transponder data is read by an antenna or communication device in the clamping assembly 300 or in the smart device 200. The data is sent to the car keys express ("CKE") server 423, which then returns data (e.g., a determined key type based on the transponder data) back to the device 100.

If the key cannot be determined by the transponder data, at decision 414 it is determined if the key can be distinguished by the Federal Communications Commission identification ("FCCID"). To further reduce the possibility of the customer selecting an incompatible key, after the customer enters their vehicle data, if through database means it is determined that multiple keys/remotes with an integrated UHF transmitter could be compatible, the user may be prompted to provide the FCCID of the master key. To accomplish this, the user could be provided with a field to manually enter the FCCID or be allowed to capture and confirm a picture of the FCCID on the master key itself. If manually entered into a field or if through openly available OCR algorithms the FCCID is deciphered, the FCCID could be uploaded to the server to further filter the results of truly compatible keys/remotes. In addition, the system may use an OCR process to detect a stamp or other indicia or marking on the key blade or an OEM emblem or symbol.

If a picture is taken or an image is captured, the picture or image may be included with the key order to provide the operator who will be cutting or making the key at a remote location or at the hub with the ability to further manually validate that the ordered key is indeed compatible with the customer's vehicle. In combination with or in lieu of the FCCID information, the user may also be prompted to push a button on the remote as described above. An integrated UHF frequency detector is used to capture and determine the fundamental transmitter frequency. This fundamental frequency could be uploaded to the server to further filter the results of truly compatible keys/remotes.

If this can be determined, at decision 415 it is determined if the FCCID must be entered or if it can be captured by photo by the smart device 200. If it must be entered, at step 416 the user is prompted to input the FCCID in a text field or similar input in step 417. If it can be captured by photo, in step 418 a video is played showing how to find and capture the FCCID on the key or key fob. In step 419 the user is prompted to interact with a user interface element on the display 210 of the smart device 200 to capture an image of the FCCID. The captured FCCID is processed, such as by optical character recognition ("OCR") in step 420. In decision 421 it is determined if the captured FCCID is valid. If it is not valid it is stored as an image with the order in step 422, and if it is valid the data is sent to the car keys express ("CKE") server 423, which then returns data (e.g., a determined key type based on the FCCID) back to the device 100.

Figure 4:
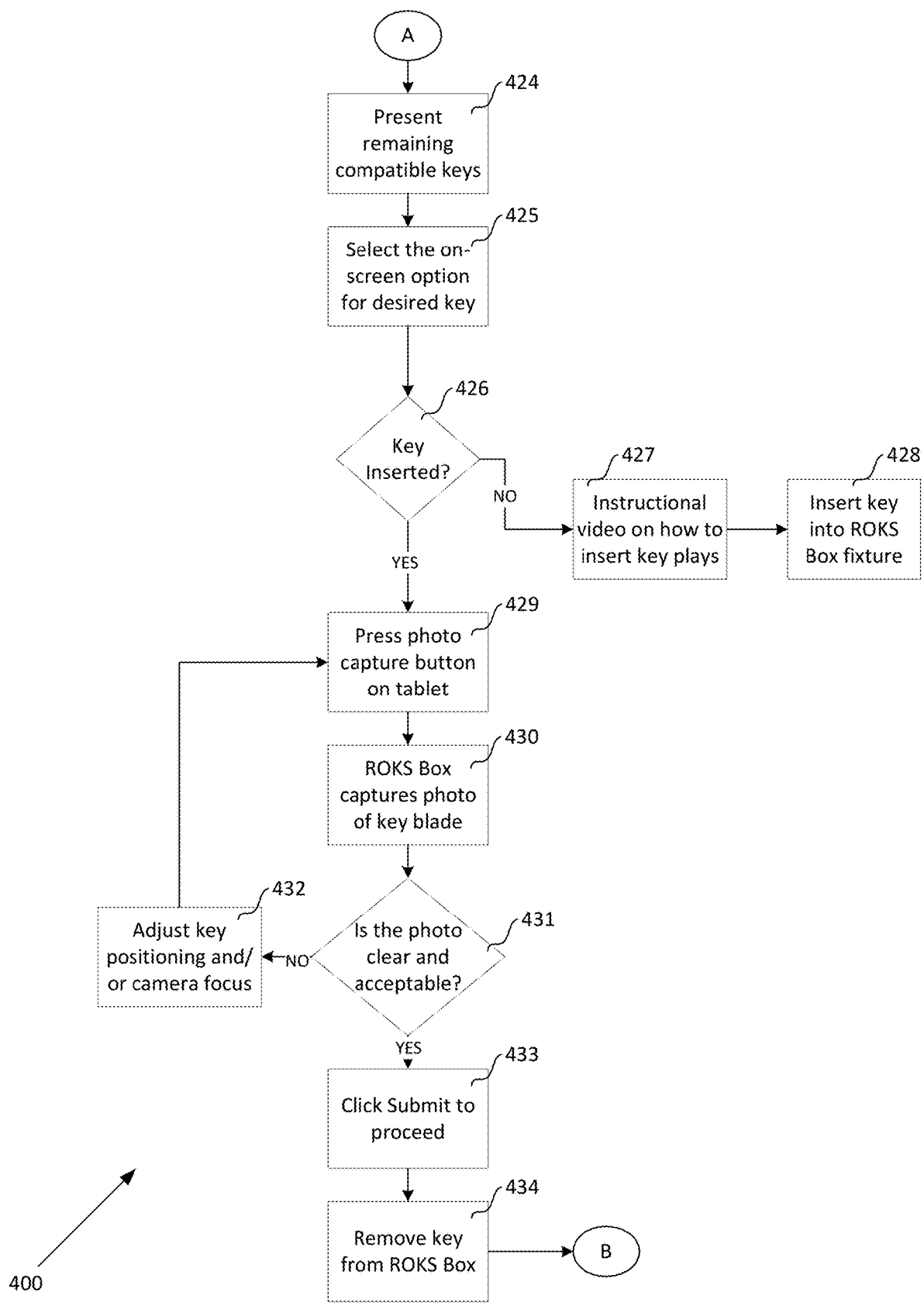
Figure 5:
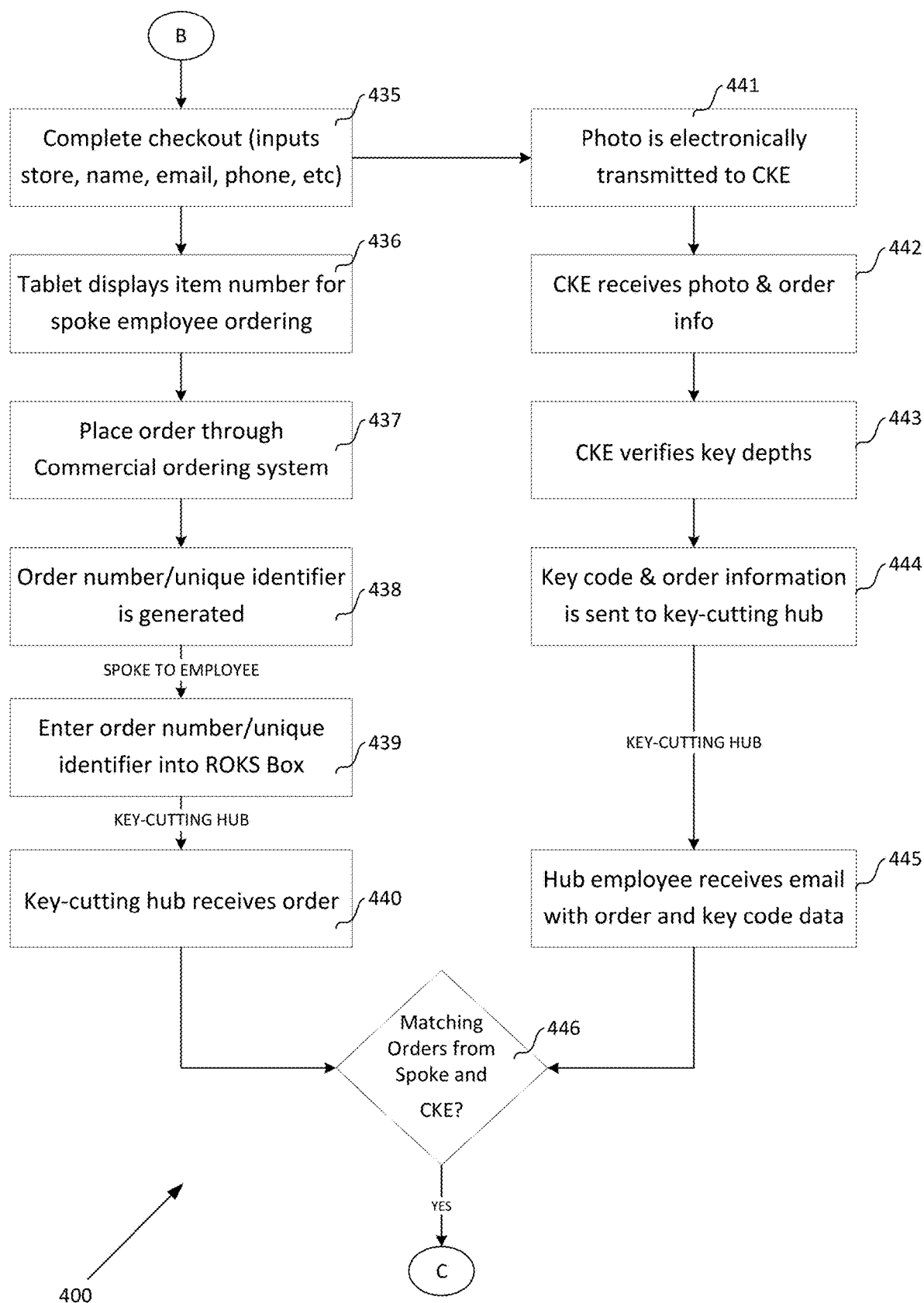
Figure 6:
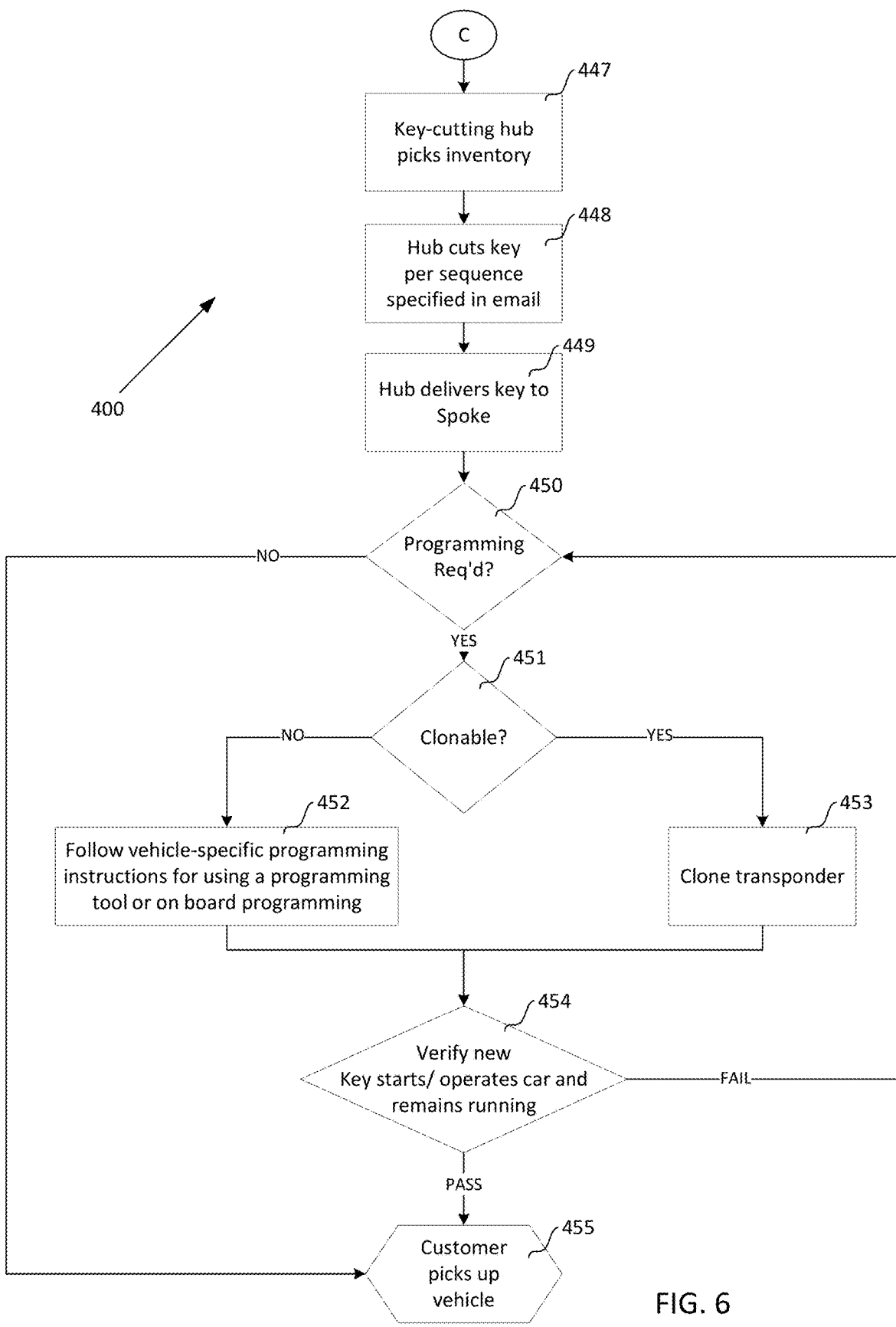

The process continues at A in FIG. 4. In step 424 the user or customer is shown images of possible keys/remote that are compatible with their vehicle, then chooses key/remote to order by selecting the on-screen option for the desired key in step 425. However, in some circumstance a customer may select the wrong key when ordering even though they have the master key in their hand and are presented with detailed images of the key being ordered, this possibility is mitigated using the determination processes described above.

If it is determined in decision 426 that the key is not inserted, at step 427 a video is played illustrating how to insert the key into the device 100 and in step 428 the user inserts the key. In step 429, if the key is inserted the smart device 200 in step 430 captures an image of the key blade when the user interacts with a user interface element such as a button in step 429. In decision 431 if the photo is acceptable the process proceeds to step 433 and if not in step 432 the user is prompted to adjust the key positioning and/or camera focus and the process returns to step 429. In step 433 the user is prompted to submit the order by interacting with a user interface element and then in step 434 removes the master key from the device 100. The process continues at B in FIG. 5.

In step 435 the checkout process for the order is completed by inputting or determining store information, user name, email and phone number in addition to other information. In step 436 the smart device 200 displays an item number for an employee at the spoke location where the device 100 is located to use in completing obtaining payment for and finalizing the order. A store representative may be prompted for a password or other means of authorizing the process to proceed. In step 437 the order is placed through the commercial system at the spoke location business through their normal ordering and point-of-sale ("POS") software and systems. In step 438 an order number, which may be a unique identifier, is generated. The spoke employee then, in step 439, enters the order number into the device 100. The order with order number is then sent to the key-cutting hub location in step 440.

Prior to or contemporaneous with the order number and order being sent to the key cutting hub in step 440, in step 441 an ordered part number of the master key to be used in creating the replacement or cut key, the photo or image of the key blade and/or FCCID, transponder or fundamental frequency information, and other vehicle information are transmitted to a server such as a car keys express ("CKE") or iKEYLESS system. On the server side in step 442, through database means, this received order information is associated with the "CKE ID" corresponding to the combination of the vehicle information and ordered key part number. The CKE ID is a collection of records that associates a minimum of the key blade type (e.g., generic blank Ilco part number), depth and spacing data (DSD) for the cutting of the key, and key series. Key data is verified in step 444 and this information is then transmitted to the key cutting hub in step 445 where an employee at the hub receives an email with order and key code data.

Using the tablet's front camera, the user also captures image of and uploads to server a picture of the full key showing shape, size, and button configuration. This aids in validation at iKEYLESS (server side) and/or at the hub that the ordered key is indeed compatible with the customer's vehicle. Customers may be provided with the ability to upgrade (e.g., they have a transponder key and separate remote and would like to buy a head key) or downgrade (e.g., the customer has a smartkey and wants a transponder key) the ordered key type, and the image of the master key will allow the operator at iKEYLESS and/or the hub to verify that the ordered key has the same blade type, key series, and will successfully pair with the customer's entered vehicle.

At the remote server one or more automatically executed algorithms or computer image processing techniques alone or in combination with operator processing and verification are used to process the image or images to decipher bitting information.

Processing of the image of the master key to be copied comprises the first step of detecting the outline of the key in a 2-D space, broken up into best-fit line segments, then evaluating those segments according to a set of known key blank physical properties and applicable tolerances in order to auto-correct (e.g., deskew, stretch/compress), auto-rotate, auto-align, and auto-scale the key image to either the tip or shoulder. The properties considered in this evaluation may include security type (e.g., edge-cut or high security), double or single sided, parallel and orthogonal surface locations, blade width, blade tip to shoulder distance, blade tip to first bit distance, blade shoulder to first bit distance, flat widths, cut angles, alignment surfaces (i.e., tip or shoulder), and MMY (in consideration of key wear likelihood and tendency).

The second step of determining the grid extents is then performed. Parallel lines, one for the top and one for the bottom, are assigned. Next, at a right angle to the top and bottom lines, tip and shoulder (if applicable to the key blank) lines are assigned.

The third step comprises overlaying a "grid" of the key blank's known depth and spacing data (DSD) onto the key image, where edge detection is then used to assign a bit position and bit number, along with a confidence value. The confidence may be a function of one or more of the following: known tolerances, thicknesses of detected shadows at each suspected bit position location; degree of agreement between opposite sides (in the case of a 2-sided symmetrical keyway); blade profile differences that can contribute to predictable differences in light and shadow thicknesses; bit error at each bit position using the absolute value of the error between the measured cut depth and the depth assigned to the detected bit value; and the sum of this same error across all bits.

Next, at each bit position, the bit number with the highest confidence value is output. This is the First Pass Bitting Output. The fourth step executes a pseudo closed-loop bitting determination or validation algorithm, which is iterative in nature and is critical in the evaluation and adjustment of the bitting output of each "pass" or processing step to ultimately arrive at a final bitting output with the highest confidence value. This algorithm consists of referencing known validation data against each "pass" of the validation algorithm and updating the confidence value at each bit position. For greater quality control, when the final bitting output is determined, to help minimize incorrect key bitting determination and unhappy customers, if the confidence value is below a predetermined threshold, an expert operator is flagged to manually check and/or adjust the deciphered key characteristics.

The primary validation data used is a lookup table of all valid bitting permutations, or "key codes" for the known key series. After each pass of the algorithm, a confidence value is calculated based on the bit error at each bit position between the absolute value of the difference between the measured cut depth at that bit position and the cut depth associated to the bit value at that same position of the potential matching key code. For any pass of the algorithm, a falsely deciphered key code match is inherently unlikely as the number of key codes in any particular key series is a small subset of all possible permutations that can be generated from the full space of bitting. For example, key series "40000-49999" used on TOYOTA 5-cut high security keys has 10,000 key codes, out of 59,049 (10 bit positions, 3 depths) possible permutations. So, in this example, the probability of wrongly deciphering a series of key cuts as any key code is about 17%. The probability of a false match is further decreased by applying the previously described predetermined confidence value limit to every potential match and selecting the potential match with the highest confidence value.

To aid the automatic algorithm and/or operator in reducing the number of passes of the algorithm (i.e., reducing the number of possible matching key codes), a key code/bitting search algorithm utilizes search criteria which may comprise one or more of the following: the number of bits; the maximum bit value allowed at the first bit position; the minimum and maximum bits values; the maximum adjacent bit variation (MACS); the minimum number of different bit values; the minimum difference between the highest bit value and lowest bit value; the maximum number of repeated adjacent bit values; the maximum number of times any bit value may appear; the likelihood that any two or more bit positions are the same bit values; and the possible range of values at any particular bit position. Given the low probability of a false match to a valid key code within a known key series and again using the key series "40000-49999" as an example, the key code/bitting search algorithm can reduce the list of potential matches from 10,000 to 3 with only a few of the search criteria being applied. At that point, the match with the highest calculated confidence value is selected.

When manual checking and adjustment occurs, over time, the algorithm logs its iterative failures and final successes to provide for experts to adjust the automatic algorithms, increasing the final pass bitting output accuracy.

Once the key code is determined, it is stored to memory. Then, the ordered key information along with the key code, bitting, image of the master key and not of the key blade itself, vehicle information, part number of ordered key, and order number are sent to hub for cutting. If this information matches from the spoke and from the server (iKEYLESS system), at decision 446 the process proceeds.

In step 447 an operator at the "hub" retrieves a key blank matching the ordered key from inventory, which may be part of or integrated with a key duplication machine, and compares the picture of the master key key blade with the ordered key selected from inventory to verify compatibility. In step 448, the operator cuts the key to code. In step 499 the hub location dispatches a delivery driver to provide the key to the "spoke".

If it is determined at decision 450 that the ordered key requires a pairing process, at decision 451 it is determined if the included transponder is cloneable. If a cloneable transponder does not exist within the ordered key, the driver OR spoke employee pairs the key to the customer's vehicle at step 452 using either vehicle specific On-Board Programming procedures or a separate programming tool. If the transponder is cloneable, it may be cloned using an integrated or attached key cloning device in step 453. In step 454 it is determined if the new key starts the vehicle and operates the door locks. If the key passes or does not require programming it is delivered to the customer with their vehicle in step 455, if it does not, the programming step is reattempted.

With reference to the process 400 shown in FIGS. 3-6, the remote server at the iKEYLESS system, which may be at the hub that is cutting the key or may be at a separate location, attempts to determine key code from image in an automated fashion and assigns a confidence value of its success in doing so. If the determined confidence level is below a threshold, the order is flagged for manual review. An employee of the second location (iKEYLESS sever system location or hub location) manually determines the correct key code from the captured image. If the image is poor quality and/or the key is significantly worn, the pseudo closed-loop bitting determination/validation algorithm is used to find the most likely match. A manual version of this algorithm is provided to the operators that are decoding keys manually and this greatly increases their chance of success in manual decoding and decreases the time to do so.

Figure 7:
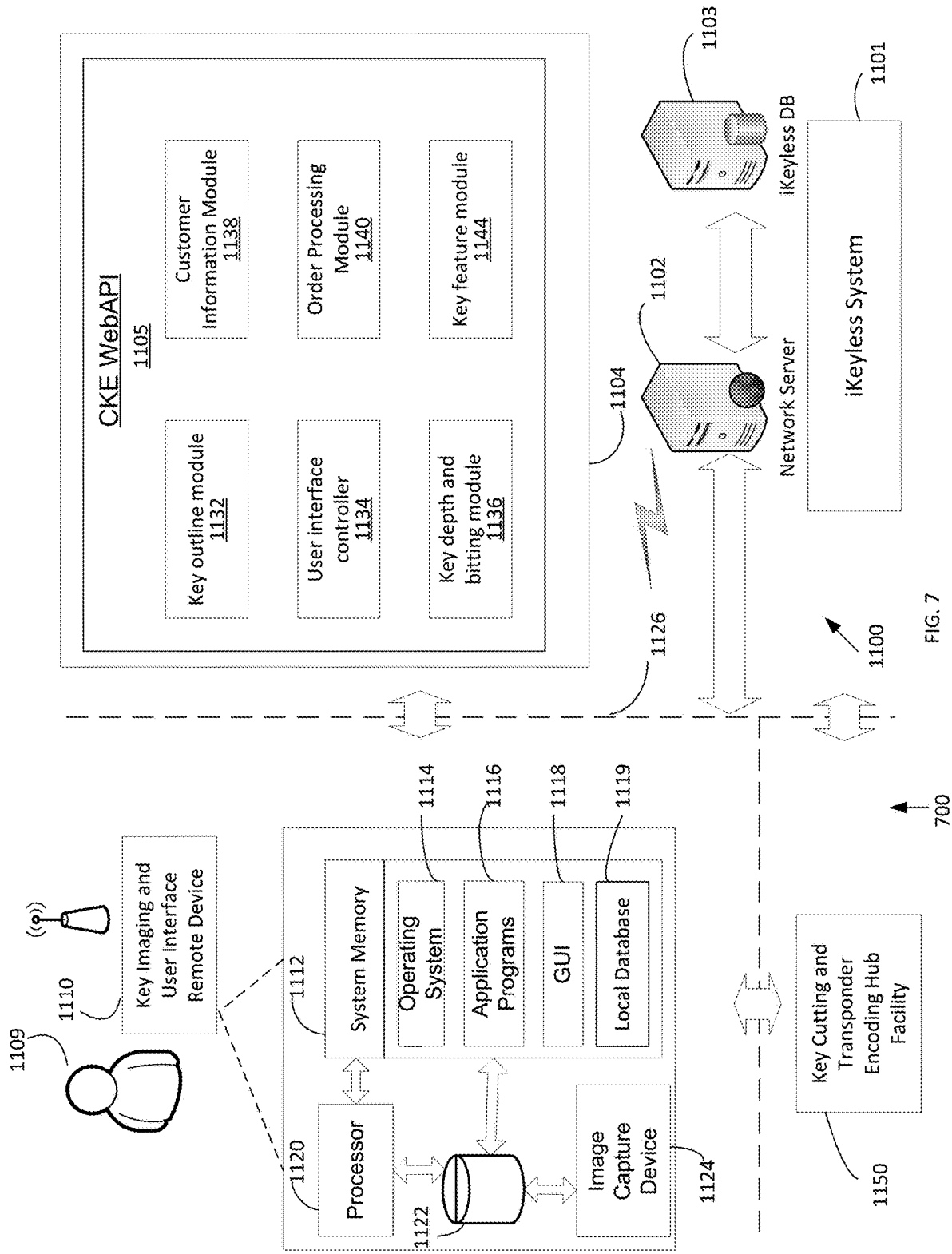
FIG. 7 provides a system diagram for a system for creating duplicate or replacement vehicle keys according to the present invention.

With reference now to FIG. 7, a system diagram for a system 700 for creating replacement vehicle keys according to the present invention is provided. The system 700 includes a remote access device 1110, such as a point-of-sale smart device located at a retail store, a central key service 1100, and a key cutting and transponder encoding hub facility 1150, all of which are adapted to communicate via a communications network 1126.

The remote access device 1110 presents user interfaces and collects user input data associated with a master key including identifying information, image data, key blank selection information, and transaction data, e.g., including a unique order number or identifier, and generates a key order record. The remote access device 1110 communicates the key order record to the central key service 1100 and/or the key cutting hub facility 1150 over communications network 1126.

The central key service 1100 processes the received master key image data and user input data, confirms or corrects the key blank selection, and determines a set of key code data for use in cutting a duplicate key. In determining the key code data, the central key service processes the master key image data in a manner described above to verify key cut depths and determine a set of key bitting data. The set of key code data is confirmed as a "valid" key code by consulting a set of known valid OEM key codes associated with the master key. The key code data represents key bitting information used to cut a duplicate key blade. The central key service 1100 determines if the master key is a transponder type key and if the key is cloneable and generates a set of programming data upon determining the key is programmable. The central key service 1100 sends the key blank order record and the key code data as well as any key programming data to the key cutting hub 1150 via the communications network 1126.

The key cutting hub 1150 receives the key blank order record and the key code data as well as any key programming data from the central key service 1100. The key cutting hub may separately receive the key blank order record from the remote access device 1110. In an alternative order flow, the remote access device 1110 may not be configured to communicate directly with the central key service 1100 and the key cutting hub may receive the key blank order from the remote access device 1110 and forward that record to the central key service 1100. The key cutting hub pulls the selected and confirmed key blank from inventory and places the selected key blank in a key cutting machine for cutting based on the received key code data. In this manner, the key cutting hub cuts a key blank without having a physical master key present and based on key code data. To the extent the duplicate key is cloneable, the key cutting hub programs the duplicate key in a cloning process or otherwise prepares the key for programming if the key is a programmable type. The key cutting hub delivers the cut duplicate key with any appropriate key programming instructions and/or dongle or other device, if necessary, to an identified recipient. For example, delivery may be to a retail store at which the remote access device 1110 is located. The user may return to the retail store to pick up the duplicate key and pair the key with the target vehicle. Alternatively, the hub or retail store may deliver the duplicate key and programming instructions/equipment directly to the user or other identified recipient based on the key order record, e.g., mail the key to the user's address, and the duplicate key may be paired with the target vehicle independent of the retail store.

Note, the central key service 1100 and the key cutting hub 1150 may be co-located and essentially a combined facility.

Now in more detail, the central key service ("CKE") system 1100 includes, for example, the iKeyless System 1101 for storing and processing user-captured images of master keys to be used in creating key blade copies. The system 1100 comprises an iKeyless or Car Keys Express WebAPI (Web Application Program Interface) 1105 which may be part of a system environment 1104 run on network server 1102 and is the conduit, or interface, through which the remote access device 1110 and the iKeyless System 1101 sends and receives information to/from the iKeyless DB 1103. The network server 1102 may be in communication with the iKeyless database 1103 which stores information used by the iKeyless System 1101 and may pre-process captured images for use in creating key blade copies. The network server 1102 may comprise a processor and a non-transitory memory which stores instructions that, when executed by the processor, transform the network server 1102 into a special purpose computing machine. The iKeyless System 1101 processes the raw images to identify a set of features associated with a master key in the images. The iKeyless System 1101 further comprises a key outline module 1132, a customer information module 1138, a user interface controller 1134, an order processing module 1140, a key depth and bitting module 1136, and a key feature module 1144, the features of which are discussed in further detail hereinbelow.

The iKeyless System 1101 may be in communication over a network, such as a local area network, wide area network, or the Internet by connection 1126 with a remote access device 1110. The Key Imaging and User Interface remote access device 1110 is operated by the user 1109 and may be a stand-alone computing device such as a computing kiosk, computer, or point-of-sale device, which may comprise a smart device or computer such as a tablet or smart phone capable of receiving user input via a touch-screen display and of capturing an image via a rear facing camera. As shown in the embodiment of FIG. 1, the remote access device 1110 is in the form of POS counter-top unit that includes as a display a tablet or the like device which include processing, memory and storage, user interface, operating system, and networking capabilities. The remote access device 1110 comprises a processor 1120, system memory 1112, local storage 1122, and an image capture device 1124. Programs and software are loaded from the local storage 1122 into the system memory 1112 and may comprise an operating system 1114, application programs 1116, a graphical user interface ("GUI") 1118, and local database 1119. An application program 1116 communicates with the local database 1119 and provides a graphical user interface 1118 that comprises a set of user interface elements for interacting with the application program. The WebAPI 1105 provides a secure encrypted interface, exposed to the web, to/from which the remote access device application can send commands/requests and receive responses. The iKeyless System 1101 may be a desktop or a mobile application or both.

As a desktop application, the iKeyless System 1101 may be a software application compatible and compliant with Microsoft Windows operating systems such as Windows 7 and newer, but may also be a web-based software-as-a-service application that is compatible with web-browsers such as Google Chrome, Mozilla Firefox, and Microsoft Edge. The iKeyless System 1101 provides for the importing, processing, and manipulation of pictures to find key bitting quickly and effectively. The iKeyless System 1101 also provides for the detection of key bitting for house keys such as Schlage and Kwikset. The iKeyless System 1101 interfaces with the WebAPI 1105 to provide for the encrypted exchange of information between the iKeyless System 1101 and the Web API 1105. The iKeyless System 1101 provides for the input of an order number and a line item number and will retrieve order provided key information ("OPKI") to start a new order including the cutting and preparation of a replacement key. The iKeyless System 1101 can use the OPKI, modify the OPKI, and revert back to earlier versions of the OPKI. The OPKI used by the iKeyless System 1101 may be confined by or associated with a set of read-only key rules. These key rules comprise one or more of a number of bits, datum location (shoulder or tip), distances of datum to each bit, key bit cut depths max and min as measured from a keyway-defined reference, Maximum Adjacent Cut Specs (MACS), permitted or disallowed bit patterns, flat distance, shoulder to tip distance, blade width, and other applicable rules.

For a new job, within the user interface of the iKeyless System 1101, the iKeyless System 1101 implements automatic algorithms with manual overrides which are applied to all photos upon import or upon manual adjustment and which comprise: the automatic detection of key features (e.g., tip, shoulder (if applicable), bottom, top, blade width, shoulder to tip distance); the auto-registration of a key image including the auto-rotation of the key, skew detection and auto-adjustment (detection of non-parallel key features) and auto-correction, stretch/compression detection (using, for example, known rules of shoulder to tip distance and blade width) and auto-correction; automatic detection of cut depths with visual indicators of the nominal cut depths for the detected bitting; zoom and pan option to make close-up, fine adjustments to the above features and registration information, and in the zoom mode, all detected key features and key bit cut depths are shown with visually indicated tolerance limits; automatic detection and highlighting of key features and key bit cut depths that break key rules; and the comparison of key bitting of up to 4 other pictures at once to verify bittings are the same through all photos.

For a reorder job using the iKeyless System 1101, all previous job data is retrieved and displayed. By default, all automatic algorithms shall be disabled, but may be enabled by the user. Similar to a new job, manual overrides are provided to the user within the user interface for the manipulation of job data and of the image.

The automatic algorithms used by the iKeyless System 1101 can, without manual manipulation, extract key cut depths and key bitting data with a high degree of accuracy. Images captured and used for extracting key information including bitting information are saved and stored by the iKeyless System 1101. The performance of the iKeyless System 1101 may be audited, for example, to determine the performance of the automatic detection and auto-registration algorithms. For an audit, after the initial import of key images and application of all automatic algorithms (which are enabled for new job and disabled for a re-order job), all initial job data (e.g., feature locations, registration information, key bitting, cut depths, breaks rules (yes/no) on a feature by feature and bit by bit basis) is saved locally. Then, upon exiting and/or saving the job, all initial and final job data may be exported via the iKeyless WebAPI 1105 and processed externally to determine accuracy.

As a mobile application, the iKeyless System 1101 may be a mobile application that is compatible and compliant with at least Apple IOS and/or Android standards. The mobile application version of the iKeyless System 1101 interfaces with the iKeyless WebAPI 1105 to allow encrypted exchange of information. The mobile application for the iKeyless System 1101 provides a user interface for a user to create a new account or log into existing account, access previous orders for review of order progress or to re-order, take pictures of existing key, buy new keys, and buy upgrades to previous or existing key products. A user may order automotive keys or house keys through the mobile application. In addition to the features provided by the desktop application version of the iKeyless System 1101, the mobile application, and desktop application, also display slides or video clips showing a user how to take the best pictures of their key for the extraction of key information. This may include showing an example of what a "perfect" picture looks like. When taking an image of a key, camera orientation locked so that tilting mobile device will not auto-flip the screen, tilting the phone too far turns the screen red and prevents the taking of a picture, the flash defaults to being on with an option for it to be disabled, and a generic key silhouette is shown on the screen. After a picture is taken the picture displays an animation which traces the key outline to provide an indication to the user that the application has detected the outline of the key.

After key images have been captured and key information or data has been extracted, the user or customer may select an option to not have their key kept on file, to assign a nickname to key, to add a key purchase to a shopping cart, to remove items from the cart, to checkout, and to continue shopping. The user may also be presented with one or more "upsell" options to provide the user with the option to purchase additional keys and/or services based on what the customer has selected for purchase. For example, the user may be presented with the option to buy an extra remote for a vehicle, or buy an integrated key and remote instead of a separate key and remote. After an order has been entered, clicking on previous non-fulfilled orders allow user to see progress of order. For example, the user may be shown order statuses including: "Expert reviewing", "Expert cutting", and "Shipped".

Processing of the image or images of the master key to be copied comprises evaluating the image according to key bitting rules and determining if the key bittings determined from the image or images is within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A set of target key features are determined from this best possible outline to be used to create the key blade copy. The target key features comprise at least blade rotation, blade top line, blade bottom line, blade tip endpoint, blade shoulder line, shoulder to tip length, and blade width. This set of target key features is then compared to key bitting rules and tolerances to determine if the modified outline is an acceptable outline conforming to key bitting rules and tolerances from which a key blade copy may be cut. For each key type or model of key in the system, the key bitting rules contain measurements and parameters such as number of bits, shoulder to first bit, bit to bit spacing, bit heights as measured from a key-type-defined reference line, and maximum adjacent cut specs (MACS).

The captured image is analyzed in real-time to ensure the image is of the quality needed for further processing and provides input back to the user. The application may notify the user that the picture of sufficient quality or may inform the user that they need to recapture the image. Image processing algorithms to identify required key cuts includes software and algorithms that validates the captured image of the master key in real time. Additional key alignment algorithms for getting clean edge and surface images are also used. Another algorithm and process are used to identify and fix worn or damaged keys. This algorithm may identify and fix an outline of the master key in the captured image and adjust or geometrically change the outline including by adjusting the cut height to compensate for worn contours. Additional processes may be used to provide for better processing of a captured image, and these processes include limiting or compensating for image parallax, applying digital filters to the captured image, applying color or greyscale modes for higher quality images, applying edge detection and contrast enhancement filters or algorithms, and applying sequential imaging and filtering algorithms.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method for creating a duplicate of a master key based on an image of a key blade of the master key captured at a remote access device, the image communicated to a hub facility via a communications network, the method comprising:

presenting, at the remote access device, a user interface having a set of user selectable elements for inputting prompted information;

receiving via the user interface user input data identifying a master key based on a vehicle make, model and year associated with a target vehicle operated by the master key;

based on the user input data, determining a set of potential key blank matches from a database of stored OEM key types, presenting the set of potential key blank matches via the user interface, and receiving a key blank selection of a selected one from the set of potential key blank matches;

storing the user input data and the key blank selection in a memory of the remote access device;

positioning the master key for image capture by an imaging device associated with the remote access device;

capturing master key image data by the imaging device and storing the master key image data and user input data in a memory of the remote access device and generating a key order record comprising the master key image data, the key blank selection, the user input data and transaction identifying data;

communicating the key order record to one or both of a central key service and/or a hub key cutting hub;

determining, by the central key service, a set of master key code data based on the received user input data and the master key image data, comparing the determined set of master key code data with a database of valid OEM key code data, and determining a set of key cutting data and providing the set of key cutting data to the key cutting hub; and cutting, by the key cutting hub, a duplicate key based on the set of key cutting data.

2. The method of claim 1, wherein determining, by the central key service, a set of master key code data based on the received user input data and the set of master key image data further comprises:

designating an image from the master key image data as a target image;

retrieving a set of key rules from a database;

determining a geometric outline of the master key from the target image;

determining a set of key features from the geometric outline;

determining a set of key bitting information from the set of key features;

storing the set of key bitting information and the set of key features in the database; and generating the set of key cutting data based on the set of stored key bitting information and the set of key features.

3. The method of claim 2, further comprising:

identifying a first set of faults in the set of key features by comparing the set of key features to the set of key rules;

identifying a second set of faults in the set of key bitting information by comparing the set of key bitting information to the set of key rules; and marking the first set of faults and the second set of faults in the target image of the master key.

4. The method of claim 3, further comprising correcting the first set of faults and the second set of faults to generate a best possible geometric outline and updating the set of key features and the set of key bitting information based on the best possible geometric outline.

5. The method of claim 4, wherein correcting the first set of faults and the second set of faults comprises adjusting cut height and bitting to compensate for worn contours on the master key.

6. The method of claim 1, further comprising capturing, by the remote access device, a set of transponder information related to the master key.

7. The method of claim 6 wherein capturing, by the remote access device, a set of transponder information includes at least one of the following steps:

prompting a user to press a button on the master key and determining a fundamental frequency;

reading transponder and determining type and reading transponder data;

prompting user for FCCID data and receive user input of FCCID data; and prompting user to take image of FCCID information on master key, applying OCR to image of FCCID data and determining if valid FCCID data is captured.

8. The method of claim 1, further comprising applying an image processing technique to the master key image data, the image processing technique selected from the group consisting of:

compensating for image parallax, applying digital filters to the captured image, applying color or greyscale modes for higher quality images, applying edge detection and contrast enhancement filters or algorithms, and applying sequential imaging and filtering algorithms.

9. The method of claim 1, wherein capturing master key image data by the imaging device comprises rejecting a captured image and prompting a user to capture an additional image of the master key.

10. The method of claim 1 wherein capturing master key image data by the imaging device comprises collecting a series of images of the key blade of the master key at different positions.

11. The method of claim 1 wherein determining a set of potential key blank matches from a database of stored OEM key types, includes presenting via a display a series of prompts, and iteratively determining through database means a prompt to present to the user, the set of prompts are directed at finding the following information: whether the target vehicle has a depressible start button, whether the key blade includes a stamp, pick a key shape from a set of key shapes that most closely matches the master key, identify from a set of keys a key that looks like the master key, input the FCCID, identify OEM P/N, identify the color of the key head, identify information on back of master key; wherein the series of prompts and answers determine a path to reducing the number of potential key blank matches.

12. A system for creating a duplicate of a master key based on an image of a key blade of the master key captured at a remote access device, the image communicated to a hub facility via a communications network, the system comprising memory storing instructions that, when executed by one or more processors, cause the one or more processors to:

present, at the remote access device, a user interface having a set of user selectable elements for inputting prompted information;

receive via the user interface user input data identifying a master key based on a vehicle make, model and year associated with a target vehicle operated by the master key;

based on the user input data, determine a set of potential key blank matches from a database of stored OEM key types, present the set of potential key blank matches via the user interface, and receive a key blank selection of a selected one from the set of potential key blank matches;

store the user input data and the key blank selection in a memory of the remote access device;

position the master key for image capture by an imaging device associated with the remote access device;

capture master key image data by the imaging device and storing the master key image data and user input data in a memory of the remote access device and generating a key order record comprising the master key image data, the key blank selection, the user input data and transaction identifying data;

communicate the key order record to one or both of a central key service and/or a hub key cutting hub;

determine, by the central key service, a set of master key code data based on the received user input data and the master key image data, comparing the determined set of master key code data with a database of valid OEM key code data, and determining a set of key cutting data and providing the set of key cutting data to the key cutting hub; and cut, by the key cutting hub, a duplicate key based on the set of key cutting data.

13. The system of claim 12, wherein the instructions to determine, by the central key service, a set of master key code data based on the received user input data and the set of master key image data further comprise instructions to:

designate an image from the master key image data as a target image;

retrieve a set of key rules from a database;

determine a geometric outline of the master key from the target image;

determine a set of key features from the geometric outline;

determine a set of key bitting information from the set of key features;

store the set of key bitting information and the set of key features in the database; and generate the set of key cutting data based on the set of stored key bitting information and the set of key features.

14. The system of claim 13, further comprising instructions to:

identify a first set of faults in the set of key features by comparing the set of key features to the set of key rules;

identify a second set of faults in the set of key bitting information by comparing the set of key bitting information to the set of key rules; and mark the first set of faults and the second set of faults in the target image of the master key.

15. The system of claim 14, further comprising instructions to correct the first set of faults and the second set of faults to generate a best possible geometric outline and updating the set of key features and the set of key bitting information based on the best possible geometric outline.

16. The system of claim 15, wherein the instructions to correct the first set of faults and the second set of faults comprise instructions to adjust cut height and bitting to compensate for worn contours on the master key.

17. The system of claim 12, further comprising instructions to capture, by the remote access device, a set of transponder information related to the master key.

18. The system of claim 17 wherein the instructions to capture, by the remote access device, a set of transponder information include instructions to perform at least one of the following operations:

prompt a user to press a button on the master key and determining a fundamental frequency;

read transponder and determining type and reading transponder data;

prompt user for FCCID data and receive user input of FCCID data; and prompt user to take image of FCCID information on master key, applying OCR to image of FCCID data and determining if valid FCCID data is captured.

19. The system of claim 12, further comprising instructions to apply an image processing technique to the master key image data, the image processing technique selected from the group consisting of:

compensating for image parallax, applying digital filters to the captured image, applying color or greyscale modes for higher quality images, applying edge detection and contrast enhancement filters or algorithms, and applying sequential imaging and filtering algorithms.

20. The system of claim 12, wherein the instructions to capture master key image data by the imaging device comprise instructions to reject a captured image and prompting a user to capture an additional image of the master key.

21. The system of claim 12, wherein the instructions to capture master key image data by the imaging device comprise instructions to collect a series of images of the key blade of the master key at different positions.

* * * * *